Dec. 17, 1957  R. J. WEIDNER  2,817,058
MEANS FOR CHECKING IGNITION TIMING OF AN
INTERNAL COMBUSTION ENGINE
Filed Feb. 24, 1954  3 Sheets-Sheet 1

INVENTOR.
RALPH J. WEIDNER
BY
ATTORNEY

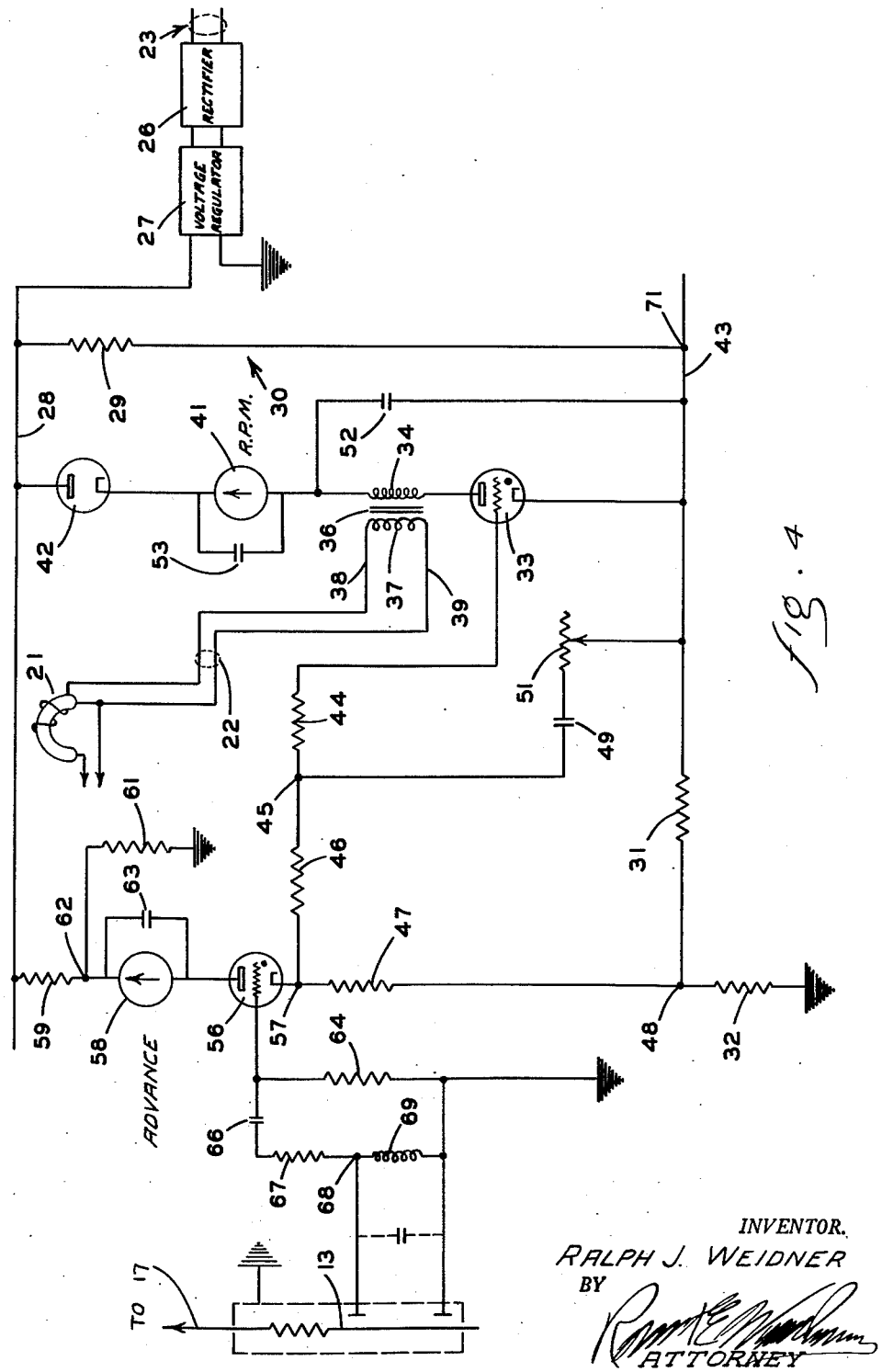

Dec. 17, 1957   R. J. WEIDNER   2,817,058
MEANS FOR CHECKING IGNITION TIMING OF AN
INTERNAL COMBUSTION ENGINE
Filed Feb. 24, 1954   3 Sheets-Sheet 3
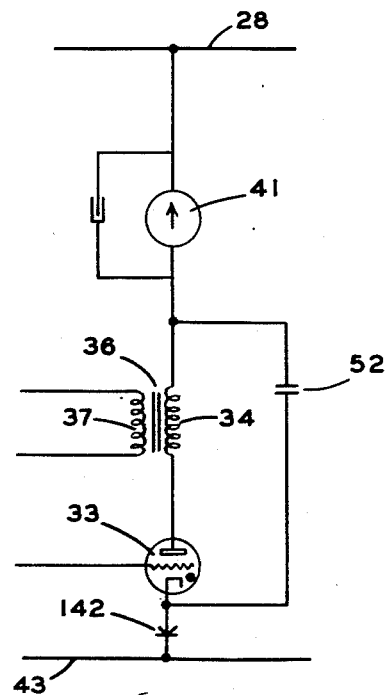
fig. 5
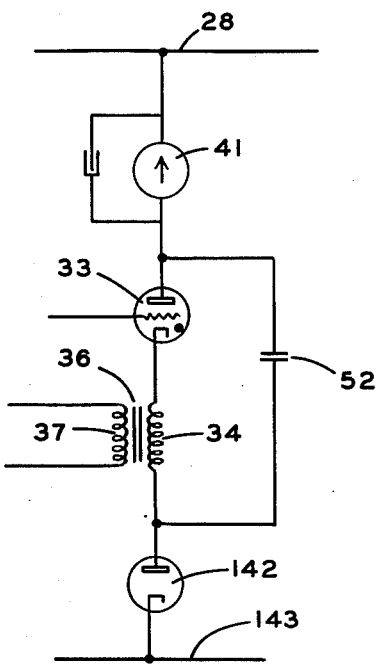
fig. 6
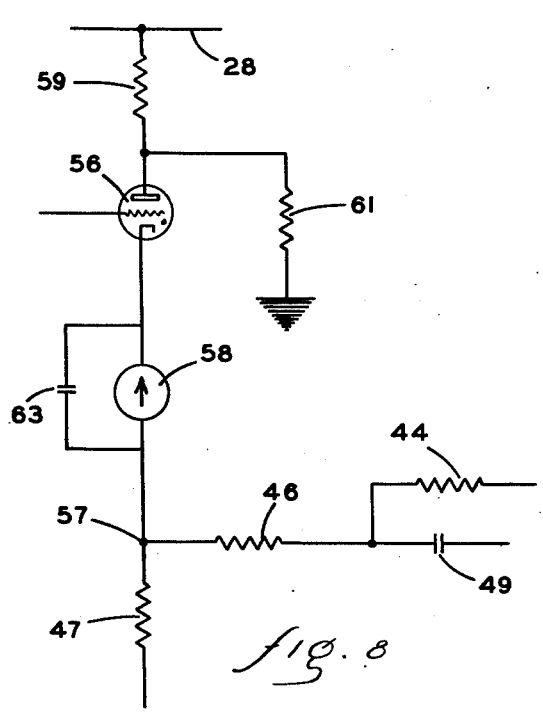
fig. 8
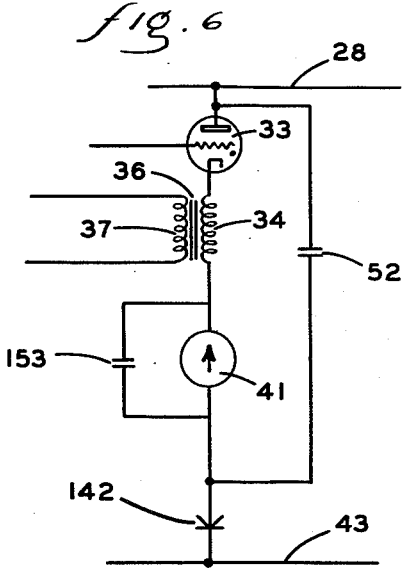
fig. 7
INVENTOR.
RALPH J. WEIDNER
BY
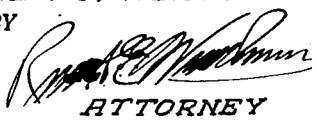
ATTORNEY

United States Patent Office 2,817,058
Patented Dec. 17, 1957

2,817,058

MEANS FOR CHECKING IGNITION TIMING OF AN INTERNAL COMBUSTION ENGINE

Ralph J. Weidner, Kalamazoo, Mich., assignor to Allen Electric & Equipment Company, Kalamazoo, Mich., a corporation of Michigan Application February 24, 1954, Serial No. 412,212

9 Claims. (Cl. 324—16)

This application relates to means for checking the ignition timing of an internal combustion engine and it particularly relates to means for determining the amount of spark advance at a given engine speed and for doing so without the necessity either of removing the distributor from the engine or of making any mechanical connection to the engine.

In adjusting the ingition timing of an internal combustion engine, it is common practice to provide in a distributor automatic means for advancing the firing point of each respective cylinder ahead of the point at which a maximum amount of burning of fuel in the cylinder is desired. The degrees of advance vary according to the speed at which the engine is running in a given instance, or, in some cases, according to the vacuum appearing in the intake manifold, in a manner and for reasons which are well understood in the art.

Inasmuch as the provision of accurate timing is highly essential to effective and efficient engine operation, it is necessary that adjustment of the timing be carried out accurately and that the automatic advancing of the point of ignition with increased engine speed and/or increased manifold vacuum be carried out also with a high degree of accuracy. Hence, the accurate checking of the distributor of an automobile at all ordinary operating conditions is highly important to the successful maintenance of the engine.

In present practice, it is common for this checking to be carried out by removal of the distributor from its operating position on an engine and the placing of the distributor on a special machine for the purposes of such checking, such as a machine of the type shown in U. S. Patent 2,366,889. This is usually accurate and is satisfactory from the point of view of the final result of such checking, but the requirement that the distributor be removed from the engine and placed onto a piece of special equipment is inconvenient and it becomes particularly troublesome and time consuming where it is not known with certainty whether the distributor is actually the source of the trouble for which a particular engine is being examined. Also, it frequently happens that a distributor will check accurately when in position on the checking machine, but it will still be inaccurate when in operating position on the engine. This may be due to bad bearings, a binding shaft, irregularities in the timing gears or other mechanical deficiencies in the apparatus driving the distributor. These items are often virtually impossible to locate and may cause no great damage by themselves, but they do make it practically impossible to time a distributor accurately in any condition other than in actual operating position on the engine.

The method and apparatus disclosed in the joint application of Lawrence V. Wells, Ralph J. Weidner and Lee W. Parmeter, Serial No. 328,978, filed December 31, 1952, now U. S. Patent No. 2,715,711, and assigned to the same assignee as the present application, discloses and claims a highly effective and satisfactory solution for the above outlined problems. However, in any art advances are continually being made and it is always desirable to provide equipment which is more economical to build than previous equipment, which operates better or which may have other advantages of many different kinds.

Accordingly, it has been a major objective of the invention to provide a device embodying the same general principles as the apparatus set forth in the above mentioned application, Serial No. 328,978, now U. S. Patent No. 2,715,711, and capable of performing the same operations but which will be comprised of less parts and therefore more economical to construct, which will have better operating characteristics and which will require less maintenance.

A further object of the invention has been to provide a device applicable to an internal combustion engine and to the distributor thereof for checking the accuracy of the ignition timing effected by said distributor and particularly for checking the accuracy by which it automatically advances the ignition timing as engine speed increases, or as vacuum increases.

A further object of the invention is to provide means, as aforesaid, which require only electrical connections to the engine or to the distributor associated therewith.

A further object of the invention is to provide apparatus responsive to an electrical impulse directed by a selected pair of terminals in the distributor to a selected spark plug for energizing the triggering circuit of a flash lamp and wherein the energization of said lamp is delayed a predetermined time after the supplying of the electrical impulse to the cable of the spark plug controlled by said terminals.

A further object of the invention has been to provide apparatus, as aforesaid, which will be characterized by a high degree of stability and accuracy.

A further object of the invention is to provide apparatus, as aforesaid, in which the period of such delay is readily and accurately varied by any desired amount.

A further object of the invention is to provide apparatus, as aforesaid, in which the period of the spark advance may be readily indicated in terms of degrees of either crank shaft or distributor rotation.

A further object of the invention is to provide apparatus, as aforesaid, which can be connected to a selected cable from the distributor and no further connections of any sort are required.

A further object of the invention is to provide apparatus, as aforesaid, which will stroboscopically illuminate a rotating part of the engine, as the fly-wheel, and the timing mark thereon, together with the matching timing mark on the housing of the engine, and will do so at a predetermined period of time following the direction of an ignition impulse to a selected spark plug by the appropriate terminals in the distributor.

A further object of the invention is to provide apparatus, as aforesaid, of sufficient simplicity as to be capable of economical manufacture and economical maintenance.

A further object of the invention is to provide apparatus which will be sturdy and capable of long service under conditions of relatively rough usage.

A further object of the invention is to provide apparatus, as aforesaid, which can be controlled from a single dial.

A further object of the invention is to provide apparatus, as aforesaid, wherein the degrees of advance can be read from a single instrument.

A further object of the invention is to provide apparatus which can be introduced into or associated with, the electrical circuit of an ignition system without changing the operating characteristics of the internal combustion engine to which said ignition system is connected.

Other objects and purposes of the invention will be apparent to persons acquainted with apparatus of this general type upon reading of the following disclosure and inspecting the accompanying drawings.

In the drawings:

Figure 4 illustrates diagrammatically a circuit for receiving energization from the distributor of an automobile and, subject to adjustable time delay, employing it to trigger a flash lamp.

Figure 5 indicates a fragment of an alternate circuit for carrying out the same purposes and having certain operational advantages over the circuit shown in Figure 4.

Figure 6 shows a fragment of a further alternate circuit for carrying out the same purposes.

Figure 7 shows a fragment of a still further alternate circuit for carrying out the same purposes.

Figure 8 indicates a fragment of a different portion of the circuit applicable with respect to the circuit shown in Figure 4, and as modified by any of Figures 5, 6 or 7, for further modifying the circuit.

*In general*

In general, the present invention continues the same basic concept as that set forth in application Serial No. 328,978, now U. S. Patent No. 2,715,711, in that it utilizes a pair of thyratrons of which one is normally rendered conductive upon the firing of a selected spark plug of the automobile engine being tested and such conduction renders a further thyratron conductive upon the elapsing of a predetermined period of time. When the second thyratron becomes conductive, a capacitor discharges into the trigger circuit of a flash lamp and effects energization thereof. Thus, by properly adjusting the time interval between the firing of the spark plug and the energization of the flash lamp, said flash lamp being utilized to illuminate the timing marks on some rotating part, as the fly-wheel, of the automobile engine, the advance of said spark plug firing ahead of the normal idling speed, or zero position, can be readily determined.

In the present circuit, the above functions are carried out with a high degree of accuracy and with a substantial reduction in the amount of equipment required as compared to the circuits originally suggested.

*Detailed description*

In setting forth a description of typical apparatus with which the invention may be used, it will be assumed that the internal combustion engine in question has its timing markings on its fly-wheel and on the part of the engine block adjacent the fly-wheel. However, it will be recognized that the apparatus of the invention will be equally applicable to those engines wherein the timing markings are on the fan drive pulley or on any other part which rotates positively with the crank shaft of the engine. It will also be assumed that the distributor rotates at one-half crank shaft speed.

Further, since the timing markings on most engines are placed with respect to the number one spark plug, the description of the present invention will be made in terms of an engine so marked, although it will be evident as the description proceeds that similar markings and analysis may be made with respect to any spark plug.

Figure 3:
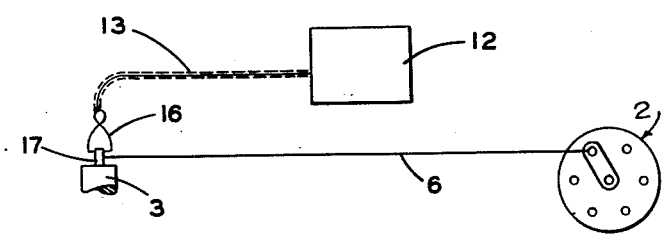
Figure 3 illustrates one method of connecting the apparatus of the invention to the automobile ignition system.

Referring to the drawings, there is shown (Figures 1, 2 and 3) a conventional internal combustion engine 1 which is provided with a distributor 2 and a plurality of conventional spark plugs of which two are indicated at 3 and 4. Conventional cables 7 and 6 lead from the respective terminals of the distributor cap to the several spark plugs. A fly-wheel 8 is associated with the engine in a conventional manner and carries a conventional timing marking 9. The matching marking 11 appears on the engine block at a suitable point adjacent said fly-wheel and indicates the position of the fly-wheel when the number one spark plug should fire at low, as idling, speeds.

The apparatus of the invention is indicated by a control box 12 having a cable 13, preferably shielded, terminating in a clip 16 adapted for engaging the spark plug terminal 17.

A flash lamp 21 is provided of the type generally indicated by United States Patent No. 2,399,222 and it is connected by a cable 22 to said control box. A power cable 23 is connected to any suitable source of electrical power, such as 115 volts alternating potential.

Turning now to a preferred circuit within the box 12 and referring particularly to Figure 4, the power cable 23 is connected to a rectifier 26 and the output of said rectifier is connected to a voltage regulator 27. The characteristics of the rectifier and the voltage regulator are such that there is supplied a substantially constant potential, such as 150 volts D. C., to the positive line conductor 28 of the apparatus. It will be recognized that any other source of substantially constant potential may be provided to energize the line conductor 28 and that the rectifier 26 and the voltage regulator 27, provided here in connection with an A. C. source, may be replaced by any convenient source of substantially steady D. C. potential.

A thyratron 33 has its cathode connected directly to a conductor 43. The anode of said thyratron is connected through the primary winding 34 of a transformer 36 thence through a meter 41 to one side of a rectifier 42. In this case, said rectifier is a diode and the connection is to the cathode thereof. The other side of said rectifier is connected to the positive line conductor 28. The secondary winding 37 of said transformer 36 supplies the conductors 38 and 39 which become the cable 22 for energizing the triggering circuit of the flash lamp 21. The principal electrodes of said lamp are energized from any convenient source, not shown, and in a conventional manner.

The meter 41 is of any common current indicating type, preferably of the moving coil type.

A voltage divider 30 includes the relatively high resistance 29, the conductor 43, a relatively low resistance 31 and a resistance of intermediate value 32.

The grid of the thyratron 33 is connected through a resistance 44 of moderate value to protect the grid to a junction point 45 and thence through a resistance 46 of very high value to a junction point 57. The junction point 57 is connected through a resistance 47 to a junction point 48 located between the resistances 31 and 32. The junction point 45 is connected through a capacitor 49 to one side of a variable resistance 51 of which the other side is connected to the conductor 43. A capacitor 52 is connected around the primary winding 34 and the thyratron 33. A further capacitor 53 provided for the purpose of steadying the meter 41 is connected around said meter. The polarity of the rectifier 42 is the same as the polarity of the thyratron 33 and hence conduction will be permitted from the line 28 through the meter 41 and thence to charge the capacitor 52 when the thyratron is non-conductive or, when said thyratron is conductive, through the thyratron 33 to ground.

While hte rectifier 42 has been above designated as a diode, it will be recognized that any convenient rectifier can be used provided only it has a very low resistance in one direction and a high resistance in another direction. Normally, a copper oxide rectifier will not have sufficient selectivity but in many instances a selenium rectifier will be acceptable.

A second thyratron 56 is connected by its cathode to the junction point 57 located between the resistances 46 and 47 and is connected by its anode through a further meter 58, of any common current indicating type, preferably of the moving coil type, and thence through a further resistance 59 to the conductor 28. A resistance 61 is connected from a junction point 62, located between the resistance 59 and the meter 58, to ground. A capacitor 63 is provided around the meter 58 for the purpose of steadying same. The grid of the thyratron 56 is connected through the resistance 64 to ground and is also connected through the capacitor 66 and a further resistance 67 to a connecting point 68, which connecting point is in turn connected through an inductance 69 to ground. Said connecting point is also connected to the spark plug contact 17, of any convenient type, through the cable 13 which is shielded and grounded in a conventional manner.

To further illustrate the invention, the values of some of the resistances involved in the above described circuit will be given. However, it should be clearly understood that such values are given solely to illustrate quantitative relationships and are presented as illustrative only and in no sense as limiting, either with respect to their specific values or with reference to their exact proportion with respect to each other. Thus, in one preferred embodiment of the circuit, resistance 29 is 27K. The resistance 31 is 2.7K and the resistance 32 is 10K. In the same embodiment, the resistance 59 is 15K and the resistance 61 is 33K. The resistance 64 is 270K and the resistance 47 is 15K. The resistance 44 may be 18K and the resistance 46 may be 560K. The capacitor 52 is provided of whatever size is required to properly trigger the flash lamp, and may advantageously be 0.3 microfarad. The capacitor 49 is of whatever capacity is required to provide the desired time lag in the firing of the thyratron 33 after the firing of the thyratron 56 and may advantageously be of 0.02 microfarad.

All other quantitative relationships may be readily supplied by any person skilled in the art and further illustration is unnecessary.

*Operation*

Now with reference to the operation of the apparatus, it will be appreciated as the description proceeds that the functioning is controlled by varying the potentials existing at various points throughout the system. Accordingly, for the purpose of illustration, certain specific potentials taken from a preferred embodiment will be utilized to improve the clarity of the illustration, but it should be borne in mind throughout that these specific values, as the values of certain resistances above mentioned, are for illustrative purposes only and are in no sense limiting.

Thus, with the apparatus in an "at rest" condition and with 150 volts D. C. with respect to ground, applied to the positive conductor 28, the resistances above mentioned for illustrative purposes will provide a potential at the point 71 of 50 volts, a potential at the point 48 of 40 volts and a potential at the point 62 of 110 volts. In this condition, since the grid of the first thyratron 33 is connected to the point 48, it is materially more negative than the cathode of said thyratron and hence said thyratron is blocked. Likewise, since the grid of the thyratron 56 is connected to ground, it is materially more negative than the cathode thereof which is connected to the point 48 and hence this thyratron is also blocked. Both thyratrons have their anodes connected to the positive line conductor 28 and hence have sufficient plate potentials to become conductive as soon as their respective grid voltages permit. The capacitor 49 will assume a charge corresponding to the voltage at point 48 as compared to the voltage on conductor 43. Also, while the apparatus is in "at rest" condition, the capacitor 52 becomes charged from line 28. The charging circuit for the capacitor 52 may be traced from the source through the line 28, the rectifier 42, the meter 41, to the capacitor 52, thence to the conductor 43 and through the resistances 31 and 32 to ground.

With the energizing of spark plug 3, to which the cable 13 is connected, a triggering impulse will be received into the system at the junction point 68, setting up oscillations, in the general manner described in application Serial No. 341,166, now abandoned, through the inductance 69 and the cable capacitance. These oscillations will have a positive component which will travel through the capacitor 66 to the grid of the thyratron 56 and render it conductive.

As soon as the thyratron 56 becomes conductive, the voltage at the point 48, continuing the example above set forth, becomes 50 volts, at the point 71 it becomes 60 volts and at the point 62 it becomes 85 volts. The negative charge on the capacitor 49, however, holds the thyratron 33 non-conductive. The movement of the potential of point 57 in a positive direction is sufficient to reverse the voltage applied across the capacitor 49 and eventually to reverse its charge and raise the potential of the grid of thyratron 33 sufficiently to render said thyratron conductive.

The setting of the variable resistor 51 determines the rate at which the charge on the capacitor 49 is reversed and hence the time required to raise the potential of the said grid to the value necessary to render the thyratron 33 conductive. When the potential on said grid has moved in a positive direction to a predetermined value, the thyratron 33 will become conductive and since a plate voltage is available, said thyratron will conduct. Thus, the time between the firing of the thyratron 56 and the firing of the thyratron 33 is precisely controllable by the setting of a single element, namely, by the setting of the variable resistor 51.

The conduction of thyratron 33 serves to ionize the gas within said thyratron and thereby to permit a discharge of the capacitor 52. This discharge takes place immediately through said thyratron and thereby energizes the transformer 36 and the cable 22 to the lamp 21. The energy from the capacitor 52 is in sufficient amount to energize and flash the lamp in the usual manner.

Simultaneously, the discharge of said capacitor has the effect of impressing a reverse potential on the principal electrodes of the thyratron 33 and immediately extinguishing same. Hence, said thyratron will be extinguished simultaneously with the completion of such discharge. Further, continuing the example above utilized, while said thyratron 33 was conductive the potential in the line 43, due to the virtual shorting between said conductor 43 and the positive line 28, rises to approximately 140 volts. The potential at the point 48 rises to approximately 112 volts and the potential at the point 62 rises to 110 volts. Thus, the potential on the cathode of the thyratron 56 is substantially more positive than that on its anode and the thyratron 56 is accordingly forthwith extinguished. Thus, with both thyratrons extinguished the system reverts to its "at rest" condition and will remain in such condition until the reception of another initiating signal from the cable 13. The capacitor 49 will discharge through the circuit including the resistances 46, 47 and 31.

The meter 41 receives pulses of current from two sources. During the brief period that the thyratron 33 is conductive, a current passes from the line conductor 28 through the meter 41, through said thyratron and thence to ground. Also, after the capacitor 52 has discharged, and after the thyratron 33 has ceased to conduct, the recharging of the capacitor 52 will effect a flow of current through the meter 41. The period of current flow resulting from the conduction of the thyratron 33 is usually different, in this embodiment it is much less, in a given cycle of operation than the period of current flow resulting from charging of the capacitor 52. However, each of said periods in any given cycle are equal to corresponding periods in all other cycles and the total current flowing through said meter 41 is proportional to the frequency of energization of the initiating cable 13 and this in turn is proportional to the engine speed. Thus, the deflection of the meter 41 will be proportional to engine speed and it may be accurately calibrated as a tachometer.

Inasmuch as conduction through the thyratron 56 continues from the time at which an impulse is received from the initiating cable 13 until the said thyratron is extinguished as a result of the conduction of the thyratron 33, the ratio between its conducting time and the time of a single period between successive energizations of the cable 13, which is also equivalent to one complete rotation of the distributor, may be adjusted to be equal to the ratio between the distributor degrees of ignition advance and a complete rotation of said distributor. Accordingly, the meter 58 may be calibrated in degrees of advance of the distributor, or of the crankshaft if preferred, and such calibration will remain accurate for all speeds of the engine.

The rectifier 42 functions to prevent the discharging of the capacitor 52 prior to the firing of the thyratron 33. Absence of this rectifier would permit a change in the charge on condenser 52 which would in turn cause the charge on this condenser to be dependent upon the amount of delay used in the advance circuit, thus changing tachometer reading with advance control settings.

Figure 1:
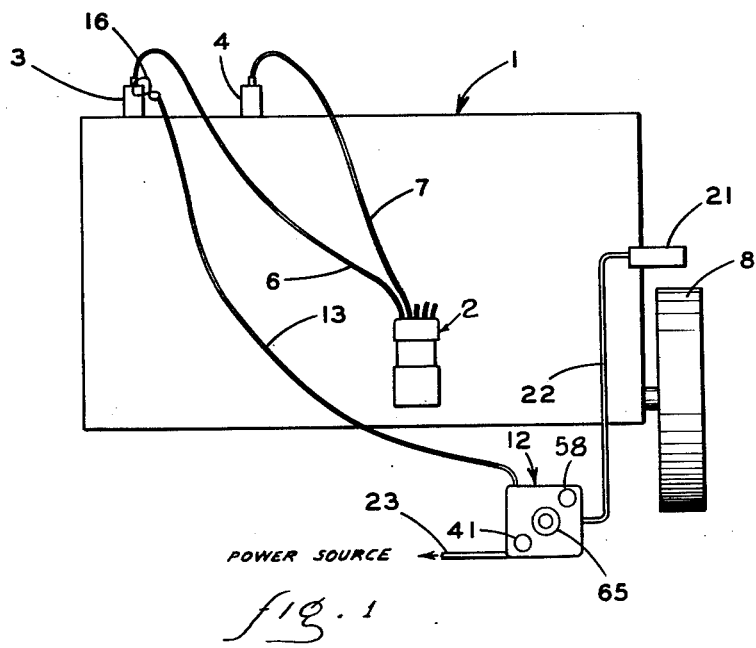
Figure 1 illustrates schematically a typical internal combustion engine including a fly-wheel and distributor associated therewith and showing the apparatus of the invention attached thereto.
Figure 2:
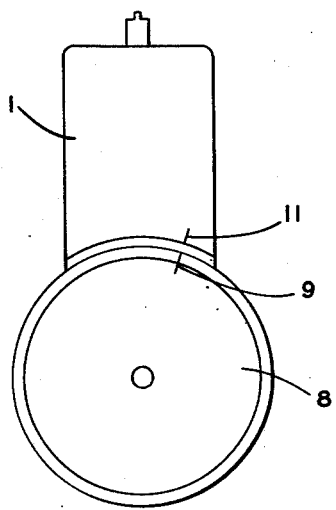
Figure 2 illustrates an end view of said engine showing the timing markings on the fly-wheel and engine housing.

Thus, with the apparatus connected as shown in Figure 1, and above described, and with the engine operating in the usual manner, the period of delay between the impulse in the spark plug cable 6, and simultaneously in the triggering cable 13, and the time of flashing of the lamp 21 may be varied by adjustment of the variable resistor 51 by the dial 65 (Figure 1). Such adjustment is made so that the timing marks 9 and 11 are caused to match in the usual manner regardless of the speed of the engine. When this is done, and bearing in mind that the normal point of matching of said timing markings assumes no ignition advance at all, it will be apparent that the delay between the time at which an impulse appears in the cable 13 and the time of flashing of the lamp will be equal to the time by which the ignition of the spark plug 3, for a given speed, precedes its point of ignition at idling speed. Thus, by calibrating the meter 58 to read directly in degrees of either distributor or crank shaft rotation, it will be possible to read directly thereon the degrees of ignition advance for any given speed of the engine.

Modifications

While there are numerous modifications which may be made in the above described circuit without departing from the scope of the invention, a few of such modifications are illustrated in Figures 5 to 8 inclusive. Such modifications are to be taken as illustrative of a few of those which are possible and not as a complete presentation thereof.

Referring first to Figure 5 there is shown the placement of the rectifier in the cathode circuit of the thyratron 33. The rectifier is here indicated generally at 142. Inasmuch as the rectifier 142 is still in the charging circuit of the capacitor 52 and is still out of its discharge circuit, the operation will be the same as above described for the circuit shown in Figure 4.

Referring to Figure 6, it is shown here that the position of the thyratron 33 and of the primary winding 34 may be reversed with respect to each other provided only that both remain within the discharge circuit of the capacitor 52 but are out of the charging circuit thereof.

However, this different positioning of the rectifier will modify the charge time constant of the capacitor 49 and make it into somewhat more of a straight-line relationship than exists with the circuit of Figure 4. However, this introduces another variable into the circuit between the two thyratrons.

In Figure 7 there is shown a somewhat further modification in which the rectifier 142 is still in the cathode circuit of the thyratron and in which the meter 41 is now placed within the part of the circuit shunted by the capacitor 52. The capacitor 153 which in all of the cases above mentioned is provided solely for steadying the reading of the meter 41 is in this case charged by the discharge of the capacitor 52 and then operates the meter by its own discharge therethrough while the capacitor 52 is being charged in the subsequent cycle. However, the basic operation of the parts remain the same as above described in connection with the circuit shown in Figure 4 and hence need no further description.

In the fragmentary circuit shown in Figure 8, it is indicated that the meter 58 may if preferred be placed in the cathode circuit of the thyratron 56. It is placed between the thyratron 56 and the junction point 57 and operates in the same manner as above described in connection with the circuit of Figure 4. This may also be done with the circuit of thyratron 33 arranged as shown in any of Figures 5, 6 or 7.

It will be also recognized, in view of the foregoing, that the apparatus above set forth will be found applicable to a number of other uses and problems, involving the illumination of a flash lamp at a predetermined period of time, whether or not adjustable, following the occurrence of an electrical event. For example, with the mechanism still triggered from the ignition system, the lamp might be used to illuminate valve or valve operating mechanism of an internal combustion engine and the time delay function would indicate the angular relationship between a given valve position and the supplying of potential to a given spark plug. Other related uses will be apparent to those skilled in the art.

While the apparatus of the invention has been illustrated with particular embodiments thereof, it will be apparent that the invention may be varied in several details at the choice of persons skilled in the art and such variations will be obvious to such persons. Accordingly, the hereinafter appended claims will be given such interpretation as will include such variations excepting as said claims may by their own terms expressly require otherwise.

I claim:

1. Apparatus for checking the ignition timing system, including a distributor, of an internal combustion engine, comprising in combination: a terminal connectible to a source of constant potential; a flash lamp having a starting circuit; a power capacitor connected to said terminal for normally being charged therefrom; a first thyratron; a transformer, the secondary winding of said transformer being connected to the starting circuit of said flash lamp; means connecting said first thyratron and the primary winding of said transformer to form a discharge circuit for said capacitor; a rectifier in series with said capacitor and in the same polarity as said first thyratron, said rectifier being located in a circuit common both to the charging circuit of said capacitor and to the circuit from said source through said thyratron to ground, but out of the discharge circuit of said capacitor; a second thyratron and a circuit including said second thyratron shunting all of said first thyratron, said capacitor, said transformer and said rectifier; first circuitry maintaining said first thyratron normally non-conductive and other circuitry effective upon conduction of said second thyratron followed by the elapsing of a predetermined period of time for affecting said first circuitry for rendering said first thyratron conductive.

2. Apparatus of claim 1 in which said rectifier is located in the anode circuit of said first thyratron.

3. The apparatus of claim 1 in which said rectifier is located in the cathode circuit of said first thyratron.

4. The apparatus of claim 1 in which a current responsive meter is positioned in series with said first thyratron.

5. The circuit described in claim 1 in which a current responsive meter is located in series with both said first thyratron and with the charging circuit of said capacitor.

6. The apparatus described in claim 1 wherein the grid of said first thyratron is connected to the cathode circuit of the second thyratron in such a manner that its potential moves in a positive direction upon conduction of said second thyratron.

7. An apparatus for checking the ignition timing system including a distributor of an internal combustion engine, comprising in combination: a source of constant potential; a flash lamp having a starting circuit; a power capacitor connected to said source; a first thyratron; a transformer, the secondary winding of said transformer being connected to the starting circuit of said flash lamp; means connecting said thyratron in series with the primary winding of said transformer and in closed circuit through said primary winding with said power capacitor; a first voltage divider network having a relatively large first resistance between said source and a first point thereon, a relatively small second resistance between said first point and a second point thereon and an intermediate resistance between said second point and ground; a second voltage divider network having a relatively small resistance between said source of constant potential and a connecting point thereon and a relatively high resistance between said connecting point and ground; a circuit including a second thyratron connecting said connecting point and said second point, the anode of said second thyratron being connected to said connecting point and the cathode thereof being connected to said second point; the anode of said first thyratron being connected to the positive side of said constant source, the cathode of said first thyratron being connected to said first point and the grid of said first thyratron being connected to the cathode of said second thyratron; said grid being also connected through a timing capacitor and a resistance to the cathode of said first thyratron; a rectifier interposed in series with said first thyratron and in the same sense as said first thyratron, and positioned also in series with the power capacitor in the charging circuit thereof but outside of said closed circuit.

8. An apparatus for checking the ignition timing system including a distributor of an internal combustion engine, comprising in combination: a source of constant potential; a flash lamp having a starting circuit; a power capacitor; a first thyratron; a transformer, the secondary winding of said transformer being connected to the starting circuit of said flash lamp; a first voltage divider network having a first, relatively large resistance between said source and a first point thereon, a relatively small second resistance between said first point and a second point thereon and an intermediate resistance between said second point and ground; means connecting the anode of said first thyratron in series with the primary winding of said transformer and means connecting the cathode of said thyratron to said first point; means connecting said power capacitor in parallel with the series group comprising said first thyratron and said primary winding; a circuit including a rectifier and a current responsive meter connecting the primary winding of said transformer to said source, said rectifier being connected in the same polarity as said first thyratron; a second voltage divider network having a relatively small resistance between said source of constant potential and a connecting point thereon and a relatively high resistance between said connecting point and ground; a circuit including a second thyratron connecting said connecting point and said second point, the anode of said second thyratron being connected to said connecting point and the cathode thereof being connected to said second point; the grid of said first thyratron being connected to the cathode of said second thyratron; said grid being also connected through a timing capacitor to a point of fixed potential with respect to the cathode of the first thyratron.

9. An apparatus for checking the ignition timing system including a distributor of an internal combustion engine, comprising in combination: a source of constant potential; a flash lamp having a starting circuit; a power capacitor; a first thyratron; a transformer, the secondary winding of said transformer being connected to the starting circuit of said flash lamp; a first voltage divider network having a relatively large first resistance between said source and a first point thereon, a relatively small second resistance between said first point and a second point thereon and an intermediate resistance between said second point and ground; means connecting the first thyratron and the primary winding in series in a discharge circuit, the end of said discharge circuit connected to the cathode of the thyratron being connected to the first point and the end of said discharge circuit connected to the anode of the thyratron being connected to the said source; means connecting said power capacitor in parallel with said discharge circuit; a circuit including a rectifier and a current responsive meter connecting the discharge circuit to said source, said rectifier being connected in the same polarity as said first thyratron; a second voltage divider network having a relatively small resistance between said source of constant potential and a connecting point thereon and a relatively high resistance between said connecting point and ground; a circuit including a second thyratron connecting said connecting point and said second point, the anode of said second thyratron being connected to said connecting point and the cathode thereof being connected to said second point; the grid of said first thyratron being connected to said second point; said grid being also connected through a timing capacitor to a point of fixed potential.

References Cited in the file of this patent

UNITED STATES PATENTS

| | | |
|---|---|---|
| 2,043,484 | Miller | June 9, 1936 |
| 2,280,949 | Hall | Apr. 28, 1942 |
| 2,426,602 | Edgerton | Sept. 2, 1947 |
| 2,449,651 | Hathaway | Sept. 21, 1948 |
| 2,606,308 | Parker | Aug. 5, 1952 |
| 2,622,229 | Lord | Dec. 16, 1952 |